(12) United States Patent
Kurasawa et al.

(10) Patent No.: US 9,158,421 B2
(45) Date of Patent: Oct. 13, 2015

(54) DISPLAY DEVICE, TOUCH DETECTION DEVICE AND ELECTRONIC APPARATUS

(71) Applicant: Japan Display Inc., Tokyo (JP)

(72) Inventors: Hayato Kurasawa, Kanagawa (JP); Koji Ishizaki, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 123 days.

(21) Appl. No.: 13/647,988

(22) Filed: Oct. 9, 2012

(65) Prior Publication Data

US 2013/0093706 A1    Apr. 18, 2013

(30) Foreign Application Priority Data

Oct. 14, 2011    (JP) .................................. 2011-227280

(51) Int. Cl.
*G06F 3/041*    (2006.01)
*G06F 3/044*    (2006.01)
*G09G 3/36*    (2006.01)

(52) U.S. Cl.
CPC .............. *G06F 3/044* (2013.01); *G06F 3/0412* (2013.01); *G09G 3/3655* (2013.01); *G09G 2300/0426* (2013.01)

(58) Field of Classification Search
None
See application file for complete search history.

(56) References Cited

U.S. PATENT DOCUMENTS

| 5,457,289 A * | 10/1995 | Huang et al. ................ 178/18.08 |
| 2012/0074961 A1* | 3/2012 | Herrmann ...................... 324/658 |
| 2012/0075218 A1* | 3/2012 | Lin et al. ........................ 345/173 |

FOREIGN PATENT DOCUMENTS

JP    2010-277461    12/2010

* cited by examiner

*Primary Examiner* — Joseph Haley
(74) *Attorney, Agent, or Firm* — K&L Gates LLP

(57) ABSTRACT

A display device includes: a display layer; plural first electrodes formed to be arranged above the display layer; a shield electrode formed apart from the plural first electrodes so as to surround the whole plural first electrodes along an arrangement surface; an insulating layer; and a semiconductive layer formed opposite to the first electrodes and the shield electrode so as to sandwich the insulating layer, wherein the difference between an average potential of the first electrodes and an average potential of the shield electrode is equal to or less than 0.5V.

16 Claims, 13 Drawing Sheets

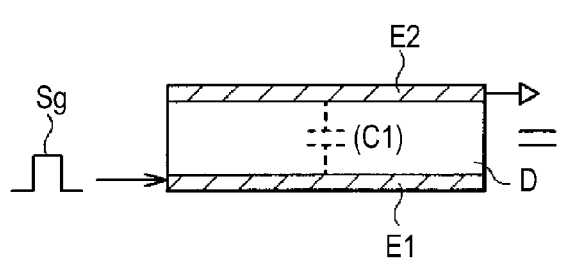
FIG.1A
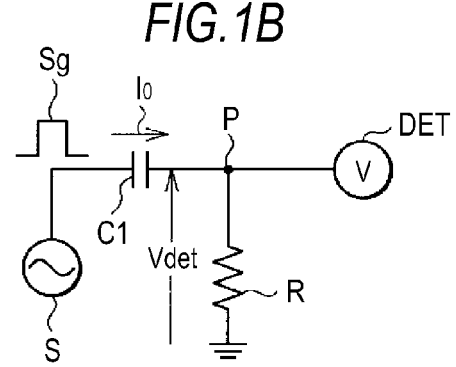
FIG.1B
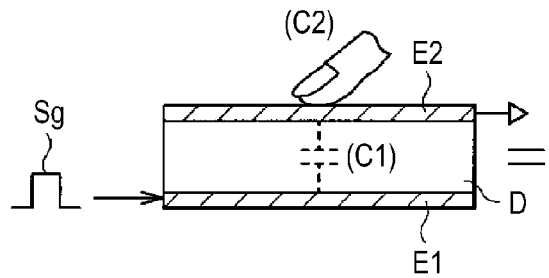
FIG.2A
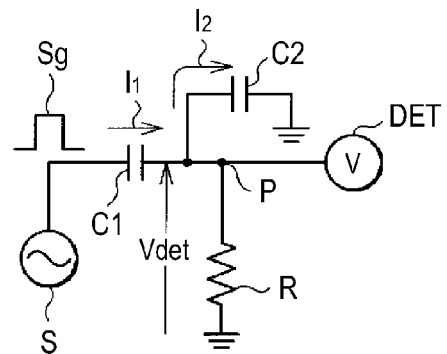
FIG.2B
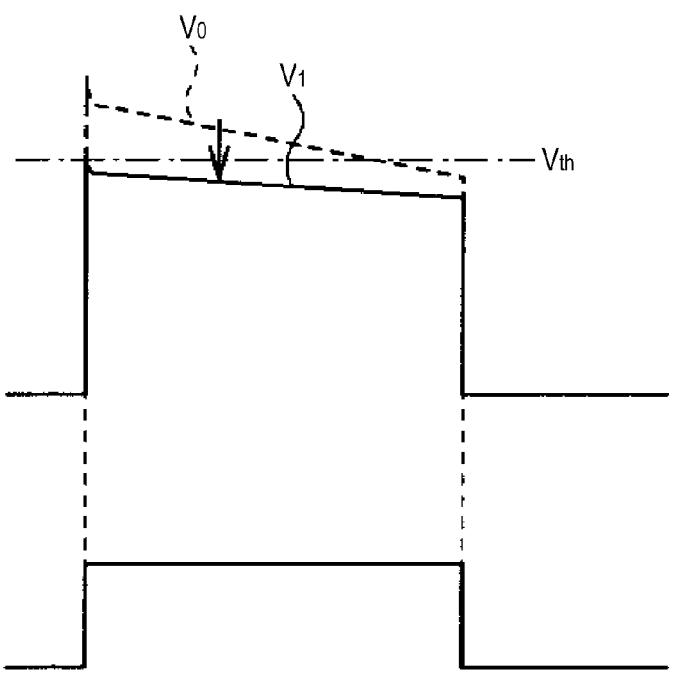
FIG.3A  Vdet
FIG.3B  Sg (Vcom)

FIG.8
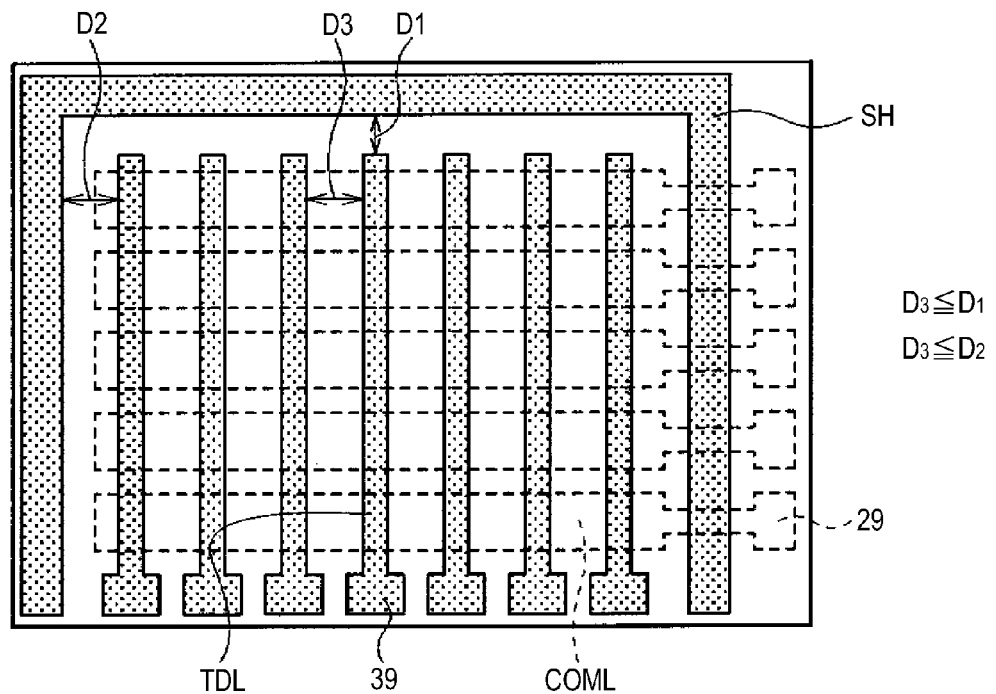
FIG.9A Vcom DRIVE SIGNAL
FIG.9B Vdet TOUCH DETECTION SIGNAL
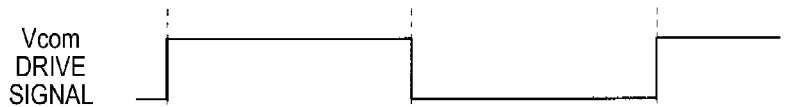
FIG.10
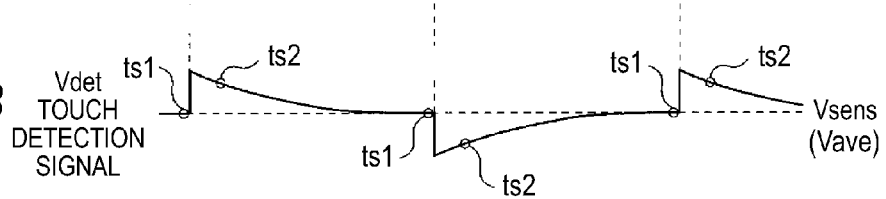
| Vave | Vsh | Vsh-Vave | DETERMINATION RESULT |
|------|-----|----------|---------------------|
| 1.4V | 1.4 | 0V | ○ |
| 1.4V | 0V | -1.4V | × (WHITE) |

| Vave | Vsh | Vsh-Vave | DETERMINATION RESULT |
|---|---|---|---|
| 1.4V | 2.0V | 0.6V | △ (BLACK) |
| 1.4V | 1.9V | 0.5V | ○ |
| 1.4V | 1.8V | 0.4V | ○ |
| 1.4V | 1.7V | 0.3V | ○ |
| ⋮ | ⋮ | ⋮ | ⋮ |
| 1.4V | 1.4 | 0V | ○ |
| ⋮ | ⋮ | ⋮ | ⋮ |
| 1.4V | 1.1V | -0.3V | ○ |
| 1.4V | 1.0V | -0.4V | ○ |
| 1.4V | 0.9V | -0.5V | △ (WHITE) |
| 1.4V | 0.8V | -0.6V | × (WHITE) |

FIG.13

| Vave | Vsh | Vsh-Vave | DETERMINATION RESULT |
|---|---|---|---|
| 1.4V | 2.0V | 0.6V | × (BLACK) |
| 1.4V | 1.9V | 0.5V | △ (BLACK) |
| 1.4V | 1.8V | 0.4V | ○ |
| 1.4V | 1.7V | 0.3V | ○ |
| ⋮ | ⋮ | ⋮ | ⋮ |
| 1.4V | 1.4 | 0V | ○ |
| ⋮ | ⋮ | ⋮ | ⋮ |
| 1.4V | 1.1V | -0.3V | ○ |
| 1.4V | 1.0V | -0.4V | ○ |
| 1.4V | 0.9V | -0.5V | △ (WHITE) |
| 1.4V | 0.8V | -0.6V | × (WHITE) |

DISPLAY DEVICE, TOUCH DETECTION DEVICE AND ELECTRONIC APPARATUS

CROSS REFERENCES TO RELATED APPLICATIONS

The present application claims priority to Japanese Priority Patent Application JP 2011-227280 filed in the Japan Patent Office on Oct. 14, 2011, the entire content of which is hereby incorporated by reference.

BACKGROUND

The present disclosure relates to a display device having a touch detection function, a touch detection device and an electronic apparatus.

In recent years, a display device attracts attention, in which a touch detection device which is a so-called touch panel is mounted on a display panel such as a liquid crystal display device or the touch panel and the display panel are integrated and various button images and the like are displayed on the display panel to thereby enable information input instead of normal mechanical buttons. As an input device such as a keyboard, a mouse or a keypad is not necessary in such display device having the touch panel, the display device tends to be widely used not only in a computer but also in portable information terminals such as a cellular phone.

There are some touch-panel systems such as an optical type and a resistive type, and a capacitance type touch panel having a relatively simple structure as well as capable of realizing low-power consumption is requested. However, there is a danger that noise (external noise) due to an inverter fluorescent lamp, AM radio waves, an AC power supply and so on propagates through the touch panel to cause malfunction in the capacitance type touch panel.

Some types of touch panels for improving resistance to such external noise have been proposed. For example, there is proposed, in JP-A-2010-277461 (Patent Document 1), a display device with a touch detection function which includes plural scanning electrodes (drive electrodes) and plural detection electrodes (touch detection electrodes) intersecting with the scanning electrodes in a display surface and detects a touch by using variation of capacitance formed in these intersections due to external near-field objects. In the display device with the touch detection function, the danger of improper detection due to the external noise is reduced by providing a shield electrode around the touch detection electrodes so as to surround the touch detection electrodes.

SUMMARY

As it is generally desirable that the drive electrodes and the touch detection electrodes are almost invisible in the touch panel, it is expected that these electrodes are made inconspicuous.

In view of the above, it is desirable to provide a display device, a touch detection device and an electronic apparatus which allows electrodes to be inconspicuous.

An embodiment of the present disclosure is directed to a display device including a display layer, plural first electrodes, a shield electrode, an insulating layer, and a semiconductive layer. The plural first electrodes are formed to be arranged above the display layer. The shield electrode is formed apart from the plural first electrodes so as to surround the whole plural first electrodes along an arrangement surface. The semiconductive layer is formed opposite to the first electrodes and the shield electrode so as to sandwich the insulating layer. The difference between an average potential of the first electrodes and an average potential of the shield electrode is equal to or less than 0.5V. Here, the "semiconductive layer" may have resistivity in a range of, for example, approximately from 10 [$\Omega \cdot m$] to $10^{13}$ [$\Omega \cdot m$].

Another embodiment of the present disclosure is directed to a display device including a display layer, plural first electrodes, a shield electrode, an insulating layer, and a semiconductive layer. The plural first electrodes are formed to be arranged above the display layer. The shield electrode is formed apart from the plural first electrodes so as to surround the whole plural first electrodes along an arrangement surface. The semiconductive layer is formed opposite to the first electrodes and the shield electrode so as to sandwich the insulating layer. An average potential of the shield electrode is equal to or higher than an average potential of the first electrodes.

Still another embodiment of the present disclosure is directed to a touch detection device including plural first electrodes, a shield electrode, an insulating layer, and a semiconductive layer. The shield electrode is formed apart from the plural first electrodes so as to surround the whole plural first electrodes along an arrangement surface. The semiconductive layer is formed opposite to the first electrodes and the shield electrode so as to sandwich the insulating layer. The difference between an average potential of the first electrodes and an average potential of the shield electrode is equal to or less than 0.5V.

Yet another embodiment of the present disclosure is directed to an electronic apparatus including the display device described above, and corresponding to a television apparatus, a digital camera, a personal computer, a video camera, a portable terminal device such as a cellular phone and the like.

In the display device, the touch detection device and the electronic apparatus according to the embodiments of the present disclosure, when disturbance noise is applied, it is possible to reduce the danger that the disturbance noise is transmitted to the first electrodes as the shield electrode shields the first electrodes. In this case, the difference between the average potential of the first electrode and the average potential of the shield electrode is set to be equal to or less than 0.5V.

In the display device according to the another embodiment of the present disclosure, when disturbance noise is applied, it is possible to reduce the danger that the disturbance noise is transmitted to the first electrodes as the shield electrode shields the first electrodes. In this case, the average potential of the shield electrode is set to be equal to or higher than an average potential the first electrodes.

When the display device, the touch detection device and the electronic apparatus according to the embodiments of the present disclosure are used, the electrodes can be made inconspicuous as the difference between the average potential of the first electrodes and the average potential of the shield electrode is set to be equal to or less than 0.5V.

Also, when the display device according to the another embodiment of the present disclosure is used, the electrodes can be made inconspicuous as the average potential of the shield electrode is set to be equal to or higher than the average potential of the first electrodes.

Additional features and advantages are described herein, and will be apparent from the following Detailed Description and the figures.

BRIEF DESCRIPTION OF THE FIGURES

FIGS. 1A and 1B are views for explaining basic principles of a touch detection system in a display panel according to an embodiment of the present disclosure, showing a state where a finger does not touch or does not come close to the display panel;

FIGS. 2A and 2B are views for explaining basic principles of the touch detection system in the display panel according to the embodiment of the present disclosure, showing a state where a finger touches or comes close to the display panel;

FIGS. 3A and 3B are views for explaining basic principles of the touch detection system in the display panel according to the embodiment of the present disclosure, showing an example of waveforms of a drive signal and a touch detection signal;

FIG. 8 is an upper surface view showing a structure example of drive electrodes and touch detection electrodes according to the first embodiment;

FIGS. 9A and 9B are timing waveform charts showing an operation example of touch detection operation in the display panel according to the first embodiment;

FIG. 10 is a table showing an example of results of a current application test with high temperature in the display panel according to the first embodiment;

FIG. 13 is a table showing another example of results of the current application test in a display panel according to a comparative example;

DETAILED DESCRIPTION

Figure 4:
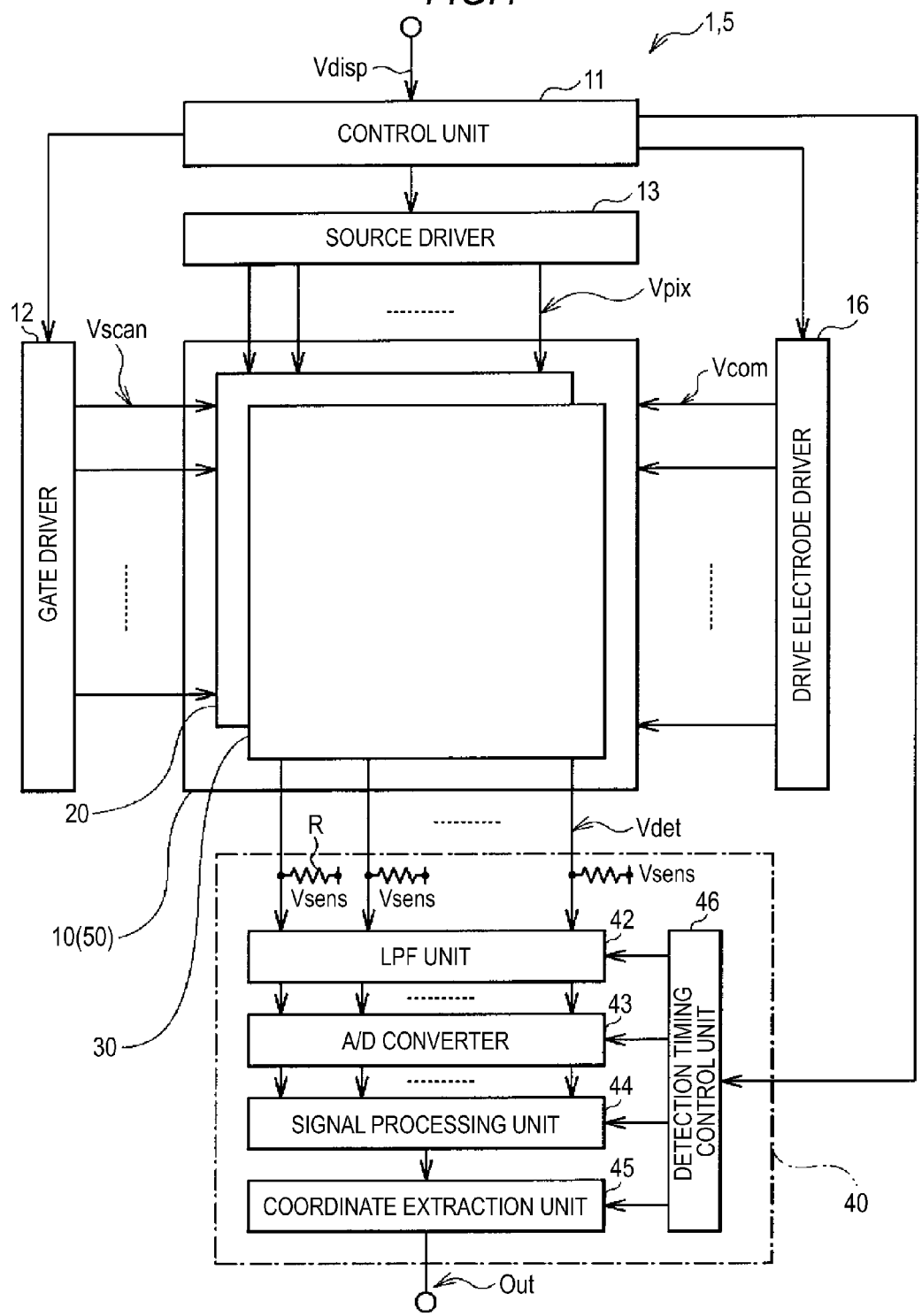
FIG. 4 is a block diagram showing a configuration example of the display panel according to the embodiment of the present disclosure.

Hereinafter, embodiments of the present disclosure will be explained in detail with reference to the drawings. The explanation will be made in the following order.

1. Basic Principles of Capacitance Type Touch Detection
2. First Embodiment (In-cell type)
3. Second Embodiment (On-cell type)
4. Application Examples <1. Basic Principles of Capacitance Type Touch Detection>

First, basic principles of touch detection in a display panel according to an embodiment of the present disclosure will be explained with reference to FIG. 1A to FIG. 3B. A touch detection system is embodied as a capacitance type touch sensor, in which, for example as shown in FIG. 1A, a pair of electrodes (a drive electrode E1 and a touch detection electrode E2) arranged opposite to each other so as to sandwich a dielectric D are used to form a capacitor device. This structure is represented as an equivalent circuit shown in FIG. 1B. The drive electrode E1, the touch detection electrode E2 and the dielectric D configure a capacitor device C1. One terminal of the capacitor device C1 is connected to an AC signal source (drive signal source) S and the other terminal P is grounded through a resistor R as well as connected to a voltage detector (touch detection circuit) DET. When an AC rectangular wave Sg (FIG. 3B) of a given frequency (for example, approximately several kHz to several dozen kHz) is applied from the AC signal source S to the drive electrode E1 (one terminal of the capacitor device C1), an output waveform (touch detection signal Vdet) as shown in FIG. 3A appears at the touch detection electrode E2 (the other terminal P of the capacitor device C1). The AC rectangular wave Sg corresponds to an AC drive signal VcomAC which will be described later.

In a state where a finger does not touch (or is not close to) the sensor, a current I0 corresponding to a capacitance value of the capacitor device C1 flows with charge/discharge to the capacitor device C1 as shown in FIG. 1B. A potential waveform of the other terminal P of the capacitor device C1 at this time is, for example, as shown by a waveform V0 of FIG. 3A, which is detected by the voltage detector DET.

On the other hand, in a state where a finger touches (or is close to) the sensor, a capacitor device C2 formed by the finger is added to the capacitor device C1 in series as shown in FIG. 2B. In this state, currents I1 and I2 respectively flow with charge/discharge to the capacitor devices C1 and C2. A potential waveform of the other terminal P of the capacitor device C1 is, for example, as shown by a waveform V1 in FIG. 3A, which is detected by the detector DET. At this time, a potential of the point P is a divided potential fixed by values of the currents I1 and I2 flowing in the capacitor devices C1 and C2. Accordingly, the waveform V1 will be a lower value than the waveform V0 in the non-contact state. The voltage detector DET compares the detected voltage to a given threshold voltage Vth and determines the state as the non-contact state when the detected voltage is equal to or higher than the threshold voltage, whereas determines the state as the contact state when the detected voltage is lower than the threshold voltage. The touch detection can be performed in the above manner.

<2. First Embodiment>
[Configuration Example]
(Entire Configuration Example)

FIG. 4 shows a configuration example of a display panel according to an embodiment. A display panel 1 is a so-called in-cell type display panel in which a liquid crystal display panel and a capacitance type touch panel are integrally formed.

The display device 1 includes a control unit 11, a gate driver 12, a source driver 13, a drive electrode driver 16, a display device with a touch detection function 10 and a touch detection unit 40.

The control unit 11 is a circuit supplying control signals to the gate driver 12, the source driver 13, the drive electrode driver 16 and the touch detection unit 40 respectively based on a video signal Vdisp and controlling these units to operate in synchronization with one another.

The gate driver 12 has a function of sequentially selecting one horizontal line to be a target of display driving in the display device with the touch detection function 10 based on the control signal supplied from the control unit 11. Specifically, the gate driver 12 applies a scanning signal Vscan to gates of TFT devices Tr of pixels Pix through scanning signal lines GCL to thereby sequentially select one line (one horizontal line) as a target of display driving in the pixels Pix formed in matrix in a liquid crystal display device 20 of the display device with the touch detection function 10 as described later.

The source driver 13 is a circuit supplying a pixel signal Vpix to respective pixels Pix (described later) of the display device with the touch detection function 10 based on the control signal supplied from the control unit 11. Specifically, the source driver 13 supplies the pixel signal Vpix to respective pixels Pix included in one horizontal line sequentially selected by the gate driver 12 respectively through pixel signal lines SGL. Then, display of one horizontal line is performed in accordance with the supplied pixel signal Vpix in these pixels Pix.

The drive electrode driver 16 is a circuit supplying a drive signal Vcom to drive electrodes COML (described later) of the display device with the touch detection function 10 based on the control signal supplied from the control unit 11. Specifically, the drive electrode driver 16 sequentially applies the drive signal Vcom having an AC rectangular waveform to the drive electrodes COML in a time sharing manner. Then, a touch detection device 30 of the display device with the touch detection function 10 outputs a touch detection signal Vdet from plural touch detection electrodes TDL (described later) based on the drive signal Vcom to be supplied to the touch detection unit 40.

The display device with the touch detection function 10 is a display device having the touch detection function. The display device with the touch detection function 10 has the liquid crystal display device 20 and the touch detection device 30. The liquid crystal display device 20 is a device performing display by sequentially scanning horizontal lines one by one in accordance with the scanning signal Vscan supplied from the gate driver 12. The touch detection device 30 operates based on the above basic principles of the capacitance type touch detection and outputs the touch detection signal Vdet.

Figure 5:
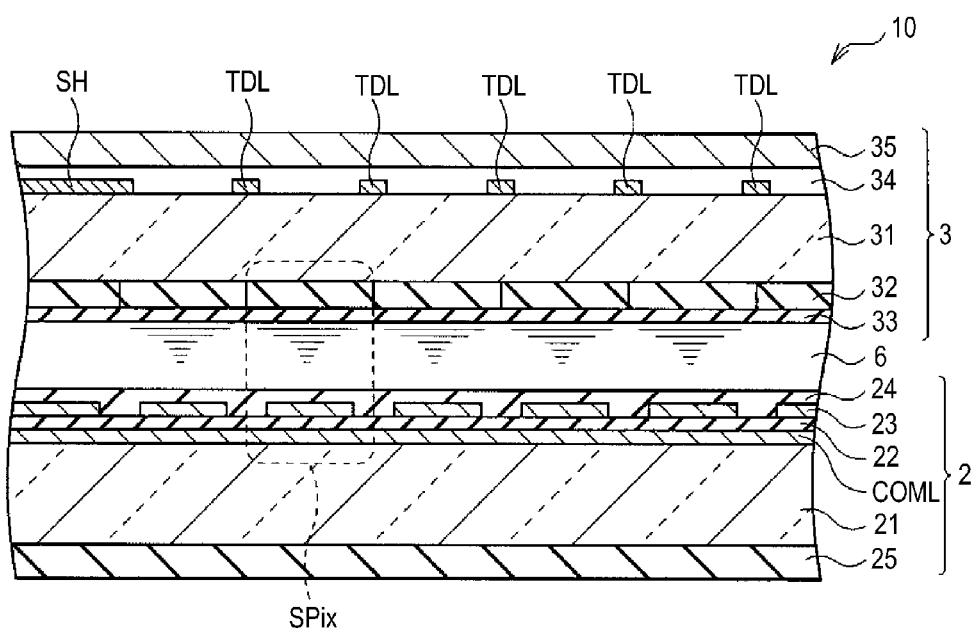
FIG. 5 is a cross-sectional view showing a schematic cross-sectional structure of a display device with a touch detection function according to a first embodiment.

FIG. 5 shows an example of a cross-sectional structure of a relevant part of the display device with the touch detection function 10. The display device with the touch detection function 10 includes a pixel substrate 2, a counter substrate 3 arranged opposite to the pixel substrate 2 and a liquid crystal layer 6 inserted between the pixel substrate 2 and the counter substrate 3.

The pixel substrate 2 includes a transparent substrate 21, the drive electrodes COML and pixel electrodes 23. The transparent substrate 21 functions as a circuit substrate on which various types of electrodes and wiring, thin film transistors (TFT) and the like are formed, which is made of, for example, glass. The drive electrodes COML are formed on the transparent substrate 21. The drive electrodes COML are electrodes for supplying a common voltage to plural pixels Pix (described later). The drive electrodes COML function as common drive electrodes for liquid crystal display operation as well as function as drive electrodes for touch detection operation. An insulating layer 22 is formed over the drive electrode COML and the pixel electrodes 23 are formed thereon. The pixel electrodes 23 are electrodes for supplying the pixel signal Vpix, having transparency. The drive electrodes COML and the pixel electrodes 23 are made of, for example, ITO (Indium Tin Oxide). An alignment film 24 is formed over the pixel electrodes 23. A polarizing plate 25 is arranged on a surface of the transparent substrate 21, which is opposite to the surface on which the drive electrodes COML and so on are formed.

The counter substrate 3 includes a transparent substrate 31, color filters 32, touch detection electrodes TDL, a shield electrode SH, an adhesive layer 34 and a polarizing plate 35. The transparent substrate 31 is made of, for example, glass in the same manner as the transparent substrate 21. On the transparent substrate 31, the color filters 32 are formed. The color filters 32 are formed by regularly arranging, for example, three color filter layers of red (R), green (G) and blue (B), in which three colors of R, G and B are associated with respective display pixels as a group. An alignment film 33 is formed on the color filters 32. The touch detection electrodes TDL and the shield electrode SH are formed on a surface of the transparent substrate 31, which is opposite to the surface on which the color filters 32 and so on are formed. The shield electrode SH is formed for protecting the touch detection electrodes TDL from external noise. The touch detection electrodes TDL and the shield electrode SH are electrodes made of, for example, ITO, and having transparency. The polarizing plate 35 is arranged above the touch detection electrodes TDL and the shield electrode SH so as to sandwich the adhesive layer 34. The resistivity of the polarizing plate 35 is, for example, approximately $10^{13}$ [Ω·m].

The liquid crystal layer 6 functions as a display function layer, modulating light transmitting through the layer in accordance with a state of an electric field. The electric field is formed by a potential difference between a voltage of the drive electrodes COML and a voltage of the pixel electrodes 23. Lateral-electric field mode liquid crystal such as FFS (fringe field switching) or IPS (in-plane switching) is used for the liquid crystal layer 6.

Figure 6:
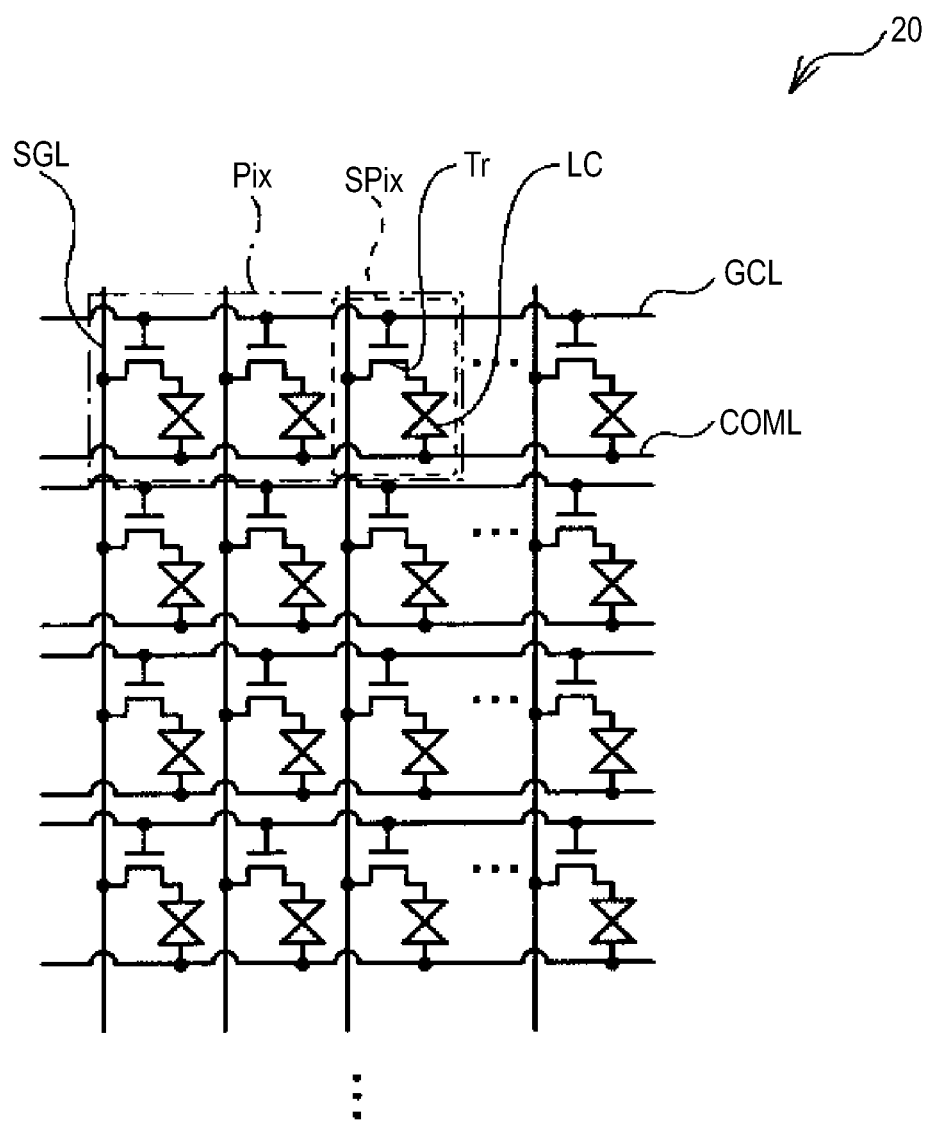
FIG. 6 is a circuit diagram showing pixel arrangement in the display device with the touch detection function according to the first embodiment.

FIG. 6 shows a configuration example of a pixel structure in the liquid crystal display device 20. The liquid crystal display device 20 has plural pixels Pix arranged in matrix. Each pixel Pix includes three sub-pixels SPix. Respective sub-pixels SPix respectively correspond to three colors (RGB) of the color filters shown in FIG. 5. Each sub-pixel SPix includes a TFT device Tr and a liquid crystal device LC. The TFT device Tr is formed by a thin film transistor, which is an n-channel MOS (Metal Oxide Semiconductor) type TFT in this example. A source of the TFT device Tr is connected to a pixel signal line SGL, a gate is connected to a scanning signal line GCL and a drain is connected to one terminal of a liquid crystal device LC. The liquid crystal device LC is connected to the drain of the TFT device Tr at one terminal and is connected to the drive electrode COML at the other terminal.

The sub-pixel SPix is connected to other sub-pixels SPix belonging to the same row of the liquid crystal display device 20 to one another by the scanning signal line GCL. The scanning signal line GCL is connected to the gate driver 12 and the scanning signal Vcan is supplied from the gate driver 12. The sub-pixel SPix is also connected to other sub-pixels SPix belonging to the same column of the liquid crystal display device 20 to one another by the pixel signal line SGL. The pixel signal line SGL is connected to the source driver 13 and the pixel signal Vpix is supplied from the source driver 13.

Moreover, the sub-pixel SPix is connected to other sub-pixels SPix belonging to the same row of the liquid crystal display device 20 to one another by the drive electrode COML. The driver electrode COML is connected to the drive electrode driver 16 and the drive signal Vcom is supplied from the drive electrode driver 16.

According to the above configuration, one horizontal line is sequentially selected by driving the scanning signal lines GCL by the gate driver 12 so as to perform line-sequential scanning in the time-sharing manner, and display is performed in units of horizontal lines by supplying the pixel signal Vpix to pixels Pix belonging to one horizontal line by the source driver 13 in the liquid crystal display device 20.

Figure 7:
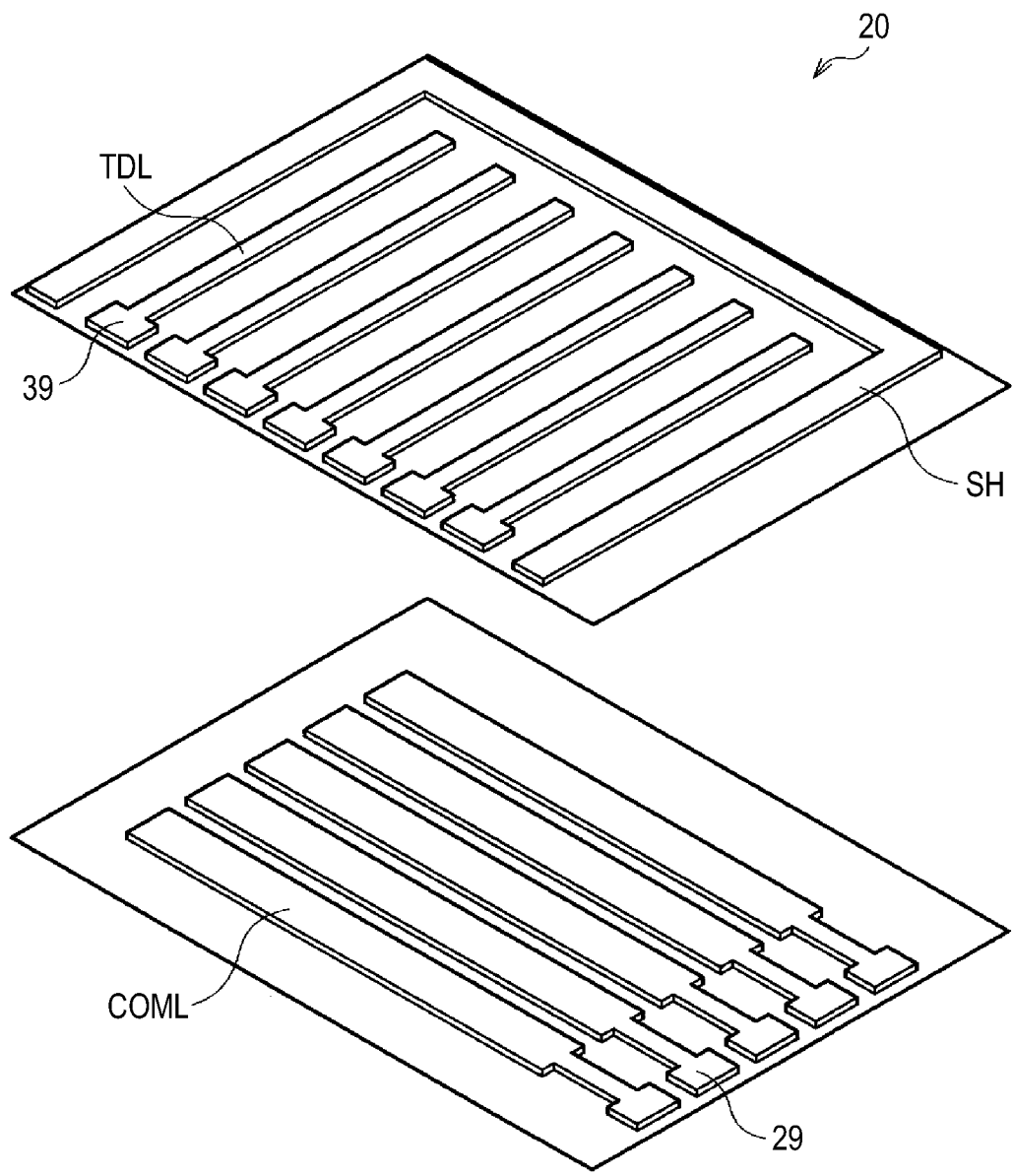
FIG. 7 is a perspective diagram showing a structure example of drive electrodes and touch detection electrodes according to the first embodiment.

FIG. 7 perspectively shows a configuration example of the touch detection device 30. FIG. 8 shows an example of an upper surface structure of the touch detection device 30. The touch detection device 30 includes the drive electrodes COML provided in the pixel substrate 2 and the touch detection electrodes TDL provided in the counter substrate 3.

The drive electrodes COML have a strip-shaped electrode pattern extending in a right and left direction of FIG. 8. A connection pad 29 for connecting to the drive electrode driver 16 is formed at one end of each drive electrode COML. When performing touch detection operation, the drive signal Vcom is sequentially supplied to respective electrodes of the pattern and sequential scanning drive is performed in the time sharing manner. The touch detection electrodes TDL have a strip-shaped electrode pattern extending in a direction (up and down direction in FIG. 8) orthogonal to the extending direction of the electrode pattern of the drive electrodes COML. A connection pad 39 for connecting to the touch detection unit 40 is formed at one end of each touch detection electrode TDL. In the example, respective connection pads 39 are formed in a vicinity of common one edge on the surface on which the touch detection electrodes TDL are formed. A DC current Vsens is applied to the touch detection electrodes TDL through high resistance as described later. In the electrode patterns of the drive electrodes COML and the touch detection electrode TDL intersecting each other, capacitance is formed at intersections.

According to the above structure, the drive signal Vcom applied to the drive electrodes COML by the drive electrode driver 16 is transmitted to the touch detection electrodes TDL and outputted from the touch detection electrodes TDL as the touch detection signal Vdet. That is, the drive electrodes COML correspond to the drive electrode E1 and the touch detection electrodes TDL correspond to the touch detection electrode E2 in the basic principles of touch detection shown in FIG. 1A to FIG. 3B. The touch detection device 30 detects a touch in accordance with the basic principles. As shown in FIG. 8, the electrode patterns intersecting each other configure the capacitance-type touch sensor in a matrix form. Therefore, scanning is performed over the entire touch detection surface of the touch detection device 30, thereby detecting a position where an external near-field object touches or comes close to the sensor.

The shield electrode SH is formed around the touch detection electrodes TDL so as to surround the touch detection electrodes TDL as shown in FIG. 7 and FIG. 8. The shield electrode SH is formed so that an arrangement area is smaller than the total arrangement area of the touch detection electrodes TDL. In the example, the shield electrode SH is formed so as to surround the touch detection electrodes TDL from three directions other than a direction of the edge where the connection pads 39 of the touch detection electrodes TDL are formed. Accordingly, the shield electrode SH is arranged, for example, in a gap between end portions of a mobile device where a user's hand touches and the touch detection electrodes TDL when the user holds the mobile device on which the display panel 1 is mounted in a hand.

A DC voltage Vsh is applied to the shield electrode SH. In the example, the DC voltage Vsh is approximately the same as the DC voltage Vsens applied to the touch detection electrodes TDL through high resistance. The DC voltage Vsh may be supplied to the shield electrode SH constantly as well as for given periods before and after the touch detection signal Vdet outputted from the touch detection electrodes TDL makes transition.

According to the above configuration, even when, for example, external noise is caught by the user holding the mobile device on which the display panel 1 is mounted as an antenna, and the noise is transmitted to the display panel 1 through the user's hand, the noise is shielded by the shield electrode SH, therefore, the danger that the noise is transmitted to the touch detection electrodes TDL can be reduced as well as the danger of improper detection due to the external noise can be reduced.

It is preferable that the shield electrode SH is arranged outside the display surface (outside an effective display area) of the display device with the touch detection function 10.

As shown in FIG. 8, it is preferable that gaps between the shield electrode SH and the touch detection electrodes TDL (a gap D1 in the up and down direction and a gap D2 in the right and left direction) are approximately the same as or larger than a gap D3 of two touch detection electrodes TDL adjacent to each other. In this case, parasitic capacitance between the shield electrode SH and the touch detection electrodes TDL can be reduced and effects due to the parasitic capacitance can be reduced at the time of detecting contact/non-contact. Here, the "gap" indicates a gap at a portion where two electrodes to be targets are positioned closest to each other.

The shield electrode SH is preferably made of the same material as the touch detection electrodes TDL. In this case, it is possible to simultaneously form the shield electrode SH and the touch detection electrodes TDL in manufacturing processes, which can reduce the number of processes and the number of masks as compared with the case where the shield electrode SH and the touch detection electrodes TDL are made of materials different from each other.

The touch detection unit 40 is a circuit detecting whether the touch detection device 30 has been touched or not based on the control signal supplied from the control unit 11 and the touch detection signal Vdet supplied from the touch detection device 30 of the display device with the touch detection function 10 and calculating coordinates in the touch detection area when the device is touched. The touch detection unit 40 includes an LPF (Low Pass Filter) unit 42, an A/D converter 43, a signal processing unit 44, a coordinate extraction unit 45 and a detection timing control unit 46.

The LPF unit 42 is a low-pass filter which removes high frequency components (noise components) included in the touch detection signal Vdet supplied from the touch detection device 30 and takes out touch components to thereby output these components respectively. Resistances R with a high resistance value are connected to respective input terminals of the LPF unit 42, and the DC voltage Vsens is applied through the resistance R. It is also preferable that, for example, switches are provided instead of the resistances R and that the DC voltage Vsens is applied by turning on the switches at given time.

The A/D converter 43 is a circuit for sampling an analog signal outputted from the LPF unit 42 and converting the signal into a digital signal respectively at timings in synchronization with the AC drive signal VcomAC. The signal processing unit 44 is a logic circuit for detecting whether the touch detection device 30 has been touched or not based on the output signal of the A/D converter 43. The coordinate extraction unit 45 is a logic circuit for calculating coordinates in the touch panel when the touch has been detected in the signal processing unit 44. The detection timing control unit 46 has a function of controlling these circuits to operate in synchronization with one another.

Here, the touch detection electrodes TDL correspond to "first electrodes" according to an embodiment of the present disclosure. The adhesive layer 34 corresponds to an "insulating layer" according to the embodiment of the present disclosure. The polarizing plate 35 corresponds to a "semiconductive layer" according to the embodiment of the present disclosure.

[Operation and Effect]

Subsequently, operation and effect of the display panel 1 according to the embodiment will be explained.

(Whole Operation Summary)

First, the whole operation summary of the display panel 1 will be explained with reference to FIG. 4. The control unit 11 respectively supplies control signals to the gate driver 12, the source driver 13, the drive electrode driver 16 and the touch detection unit 40 and controls these units to operate in synchronization with one another.

The gate driver 12 supplies the scanning signal Vscan to the liquid crystal display device 20 and sequentially selects one horizontal line to be a target of display driving. The source driver 13 supplies the pixel signal Vpix to respective pixels Pix included in one horizontal line selected by the gate driver 12. The drive electrode driver 16 sequentially applies the drive signal Vcom to the drive electrodes COML. The display device with the touch detection function 10 performs display operation as well as performs touch detection operation based on the drive signal VCOM to output the touch detection signal Vdet from the touch detection electrodes TDL.

The touch detection unit 40 detects a touch on the touch detection surface based on the touch detection signal Vdet. Specifically, the LPF unit 42 removes high frequency components included in the touch detection signal Vdet and takes out touch components to thereby output these components. The A/C converter 43 converts analog signals outputted from the LPF unit 42 into digital signals. The signal processing unit 44 detects whether the touch detection surface has been touched or not based on output signals of the A/D converter 43. The coordinate extraction unit 45 calculates coordinates in the touch panel when the touch has been detected in the signal processing unit 44. The detection timing control unit 46 controls the LPF unit 42, the A/C converter 43, the signal processing unit 44 and the coordinate extraction unit 45 to operate in synchronization with one another.

FIGS. 9A and 9B show an operation example of touch detection operation, in which FIG. 9A shows a waveform of the drive signal Vcom and FIG. 9B shows a waveform of the touch detection signal Vdet. The drive electrode driver 16 sequentially applies the drive signal Vcom having the AC rectangular waveform shown in FIG. 9A to the drive electrodes COML. The drive signal Vcom is transmitted to the touch detection electrodes TDL through capacitance and the touch detection signal Vdet changes (FIG. 9B). Specifically, the touch detection signal Vdet makes transition with the transition of the drive signal Vcom to converge to the voltage Vsens after a given period of time. That is, an average value of voltage (average voltage Vave) in the touch detection signal Vdet is approximately the same as the voltage Vsens. The A/D converter 43 samples the output signal of the LPF unit 42 to which the touch detection signal Vdet is inputted and performs A/D conversion at sampling timings ts1 and ts2 in synchronization with the drive signal Vcom (FIG. 9B). The sampling timing ts1 is provided just before the transition timing of the drive signal Vcom and the sampling timing ts2 is provided just after the transition timing of the drive signal Vcom. In the signal processing unit 44 in the touch detection unit 40, the touch detection is performed based on the difference between an A/D conversion result at the sampling timing ts1 and an A/D conversion result at the sampling timing ts2.

As shown in FIGS. 9A and 9B, the voltage Vsens (average voltage Vave) is set to be, for example, approximately the half of a power supply voltage in the display panel 1 (for example, 1.4V) as the touch detection signal Vdet is an AC signal. On the other hand, when shielding external noise and so on in the electronic apparatus, for example, a voltage of 0V is commonly used. However, there may cause a problem when the display panel 1 is operated in the above voltage setting. The example will be explained below.

(Discoloration of Touch Detection Electrodes TDL)

A current application test with high temperature was performed to the display panel 1 for evaluating reliability. At this time, discoloration of the touch detection electrodes TDL was confirmed in certain conditions. The details thereof will be explained below.

FIG. 10 shows an example of results of the current application test with high temperature. FIG. 10 represents a visual state of the touch detection electrodes TDL in a temperature condition of 70° C. after current was applied to the display panel 1 for a given period of time. In the example, the arrangement area of the shield electrode SH is approximately 1/10 of the total arrangement area of the touch detection electrodes TDL.

As shown in FIG. 10, in the case where the current application test with high temperature was performed by setting the average voltage Vave of the touch detection signal Vdet to 1.4V as well as the voltage Vsh of the shield electrode SH to 1.4V, the touch detection electrodes TDL are not visually recognized and a preferable state is maintained. On the other hand, in the case where the current application test with high temperature was performed by setting the average voltage Vave of the touch detection signal Vdet to 1.4V as well as the voltage Vsh of the shield electrode SH to 0V, the touch detection electrodes TDL were discolored to white.

That is, the touch detection electrodes TDL were not visually recognized when the voltage Vsh was equal to the average voltage Vave, whereas the touch detection electrodes TDL were visually recognized when a potential difference between the voltage Vsh and the average voltage Vave were large.

It can be considered that this is because the potential of the polarizing plate 35 was set based on the voltage Vsh of the shield electrode SH and the average value Vave of the touch detection signal Vdet and thus ions included in, for example, the adhesive layer 34 were moved as well as the composition of an electrode material of the touch detection electrodes TDL was changed. The details thereof will be explained.

Figures 11, 12:
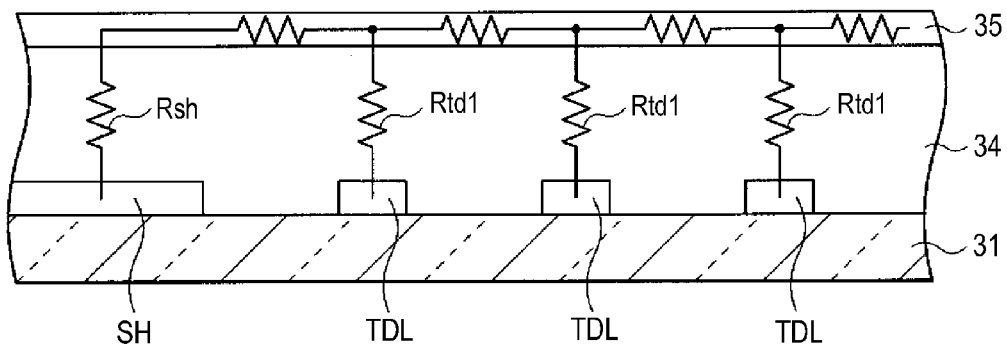
FIG. 11 is a cross-sectional view showing a cross-sectional structure of a relevant part of the display device with the touch detection function according to the first embodiment with an equivalent circuit.
FIG. 12 is a table showing another example of results of the current application test in the display panel according to the first embodiment.

FIG. 11 represents a cross-section of part of the display device with the touch detection function 10 with an equivalent circuit. As the shield electrode SH and the polarizing plate 35 are arranged so as to sandwich the adhesive layer 34, a resistance Rsh exists between the shield electrode SH and the polarizing plate 35. Additionally, the touch detection electrodes TDL and the polarizing plate 35 are also arranged so as to sandwich the adhesive layer 34, resistances Rtd1 exist between the touch detection electrodes SH and the polarizing plate 35. In the polarizing plate 35, resistances exist as distribution constants. Therefore, the potential of the polarizing plate 35 can be set by a divided voltage of the resistance Rsh, resistances of the polarizing plate 35 and the resistances Rtd1 based on the voltage Vsh of the shield electrode SH and the voltage of the touch detection electrodes TDL (the average voltage Vave of the touch detection signal Vdet).

For example, when the average voltage Vave of the touch detection signals Vdet is 1.4V and the voltage Vsh of the shield electrode SH is 0V, the polarizing plate 35 is set to a given potential between 0V and 1.4V as the voltage is divided as described above. Accordingly, an electric field is formed between the polarizing plate 35 and the touch detection electrodes TDL, and ions in the adhesive layer 34 are moved by the electric field. Then, chemical reaction occurs or the composition is changed in the electrode material of the touch detection electrodes TDL due to the movement of ions, which makes the touch detection electrodes TDL visually recognized. The reason that the touch detection electrodes TDL look white may depend on properties of ions.

According to the above consideration, it can be considered that the touch detection electrodes TDL become visually recognized in proportion as the voltage Vsh of the shield electrode deviates from the average voltage Vave of the touch detection signal Vdet. Next, degrees of potential difference in which the touch detection electrodes TDL become visually recognized will be explained.

FIG. 12 shows an example of results of the current application test with high temperature in the case where the voltage Vsh of the shield electrode SH was set to various voltages. In columns of determination results, "o" represents that the touch detection electrodes TDL were not visually recognized, "x" represents that the touch detection electrodes TDL were visually recognized and "Δ" represents that the touch detection electrodes TDL were visually recognized by some people. In the example, the average voltage Vave of the touch detection signal Vdet was fixed to 1.4V.

When the voltage Vsh of the shield electrode SH was lower than the average voltage Vave (1.4V) of the touch detection signal Vdet, the touch detection electrodes TDL were discolored to white. The touch detection electrodes TDL were visually recognized by some people at a voltage Vsh=0.9V (Vsh−Vave=−0.5V) and were visually recognized by many people at a voltage Vsh=0.8V (Vsh−Vave=−0.6V).

On the other hand, when the voltage Vsh of the shield electrode SH was higher than the average voltage Vave (1.4V) of the touch detection signal Vdet, the touch detection electrodes TDL were discolored to black, and the touch detection electrodes TDL were visually recognize by many people at a voltage Vsh=2.0V (Vsh−Vave=0.6V).

Though the average voltage Vave of the touch detection signal Vdet was set to 1.4V in the example, the same test results were obtained when the average voltage was set to other voltages.

As described above, the touch detection electrodes TDL are seen differently according to the relation in level between the voltage Vsh of the shield electrode SH and the average voltage Vave of the touch detection signal Vdet. That is, when the voltage Vsh is lower than the average voltage Vave, the touch detection electrodes TDL look white, whereas when the voltage Vsh of the shield electrode SH is higher than the average voltage Vave, the touch detection electrodes TDL look black. It can be considered that the difference in color is caused by, for example, the difference in absorption reaction or desorption reaction (oxidation-reduction reaction) with respect to the touch detection electrodes TDL, which depends on the relation in level between the voltage Vsh and the average voltage Vave.

The touch detection electrodes TDL are not recognized easily when the voltage Vsh of the shield electrode SH is higher than the average voltage Vave. That is, the touch detection electrodes TDL are not visually recognized when the potential difference between the voltage Vsh and the average voltage Vave is equal to or less than 0.4V in the case where the voltage Vsh is lower than the average voltage Vave, whereas the touch detection electrodes TDL are not visually recognized when the potential difference between the voltage Vsh and the average voltage Vave is equal to or less than 0.5V in the case where the voltage Vsh is higher than the average voltage Vave. This may be because the touch detection electrodes TDL are discolored to black when the voltage Vsh of the shield electrode SH is higher than the average voltage Vave and are not recognized easily as compared with the case where the electrodes are discolored to white.

Consequently, the touch detection electrodes TDL can be made inconspicuous by setting the voltage Vsh of the shield electrode SH in a range from a voltage (Vave−0.4V) to a voltage (Vave+0.5V) (1V to 1.9V when the average voltage Vave is 1.4V).

(Comparative Example)

Next, a display panel 1R according to a comparative example will be explained as well as effects of the present embodiment will be explained in comparison with the comparative example. In a display panel 1R, the shield electrode SH and the touch detection electrodes TDL are formed so that the arrangement area of the shield electrode is equivalent to the total arrangement area of the touch detection electrodes TDL.

FIG. 13 shows an example of results of the current application test with high temperature in the display panel 1R. In the example, when the voltage Vsh of the shield electrode SH was lower than the average voltage Vave of the touch detection signal Vdet (1.4V), the touch detection electrodes TDL were discolored to white. The touch detection electrodes TDL were visually recognized by some people at a voltage Vsh=0.9V (Vsh−Vave=−0.5V) and were visually recognized by many people at a voltage Vsh=0.8V (Vsh−Vave=−0.6V). On the other hand, when the voltage Vsh of the shield electrode SH was higher than the average voltage Vave of the touch detection signal Vdet (1.4V), the touch detection electrodes TDL were discolored to black. The touch detection electrodes TDL were visually recognized by some people at a voltage Vsh=1.9V (Vsh−Vave=0.5V) and were visually recognized by many people at a voltage Vsh=2.0V (Vsh−Vave=0.6V).

That is, the touch detection electrodes TDL are not visually recognized in the case where the voltage Vsh of the shield electrode SH is within a range from a voltage (Vave−0.4V) to a voltage (Vave+0.4V) (1V to 1.8V when the average voltage Vave is 1.4V) in the example. In short, the range of the voltage Vsh in which the touch detection electrodes TDL are not visually recognized in the display panel 1R according to the comparative example is narrower than the case of the display panel 1 according to the present embodiment (FIG. 12). Specifically, in the case where the voltage Vsh of the shield electrode SH is a voltage (Vave+0.5V) (1.9V when the average voltage Vave is 1.4V), the touch detection electrodes TDL are not visually recognized in the display panel 1 according to the present embodiment (FIG. 12), however, the touch detection electrodes TDL are visually recognized in the display panel 1R according to the comparative example (FIG. 13).

In the display panel 1R, the arrangement area of the shield electrode SH is equivalent to the total arrangement area of the touch detection electrodes TDL. Accordingly, the resistance Rsh shown in FIG. 11 is reduced as well as the resistances Rtd1 are increased in the display panel 1R according to the comparative example as compared with the case of the display panel 1 according to the present embodiment. Therefore, as the potential difference between the voltage of the polarizing plate 35 and the voltage of the touch detection electrodes TDL (the average voltage Vave of the touch detection signal Vdet) is larger than the case of the display panel 1 according to the present embodiment, the electric field between the polarizing plate 35 and the touch detection electrodes TDL becomes higher, ions in the adhesive layer 34 are easily moved and the touch detection electrodes TDL are liable to be discolored.

On the other hand, the arrangement area of the shield electrode SH is smaller than the total arrangement area of the touch detection electrodes TDL. Accordingly, as the potential difference between the voltage of the polarizing plate 35 and the average voltage Vave of the touch detection signal Vdet can be smaller than the case of the display panel 1R according to the comparative example, movement of ions in the adhesive layer 34 can be suppressed and discoloration of the touch detection electrodes TDL can be also suppressed.

[Effects]

As described above, as the potential difference between the voltage of the shield electrode and the average voltage of the touch detection signal is set to be equal to or less than 0.5V in the present embodiment, the discoloration of the touch detection electrodes can be suppressed and the touch detection electrodes can be made inconspicuous.

As the voltage of the shield electrode is set to be equal to or higher than the average voltage of the touch detection signal in the present embodiment, the range of the voltage of the shield electrode in which the touch detection electrodes are inconspicuous can be wider than the case where the voltage of the shield electrode is set to be lower than the average voltage of the touch detection signal. Particularly, for example, when the voltage of the shield electrode is equal to the average voltage of the touch detection signal, the voltage Vsh and the voltage Vsens (average voltage Vave) can be generated by a common reference power supply, therefore, a circuit configuration can be simplified.

Additionally, as the arrangement area of the shield electrode is smaller than the total arrangement area of the touch detection electrodes, movement of ions in the adhesive layer can be suppressed and discoloration of the touch detection electrodes TDL can be also suppressed, as a result, the touch detection electrodes can be made inconspicuous.

[Modification Example 1-1]

Figure 14:
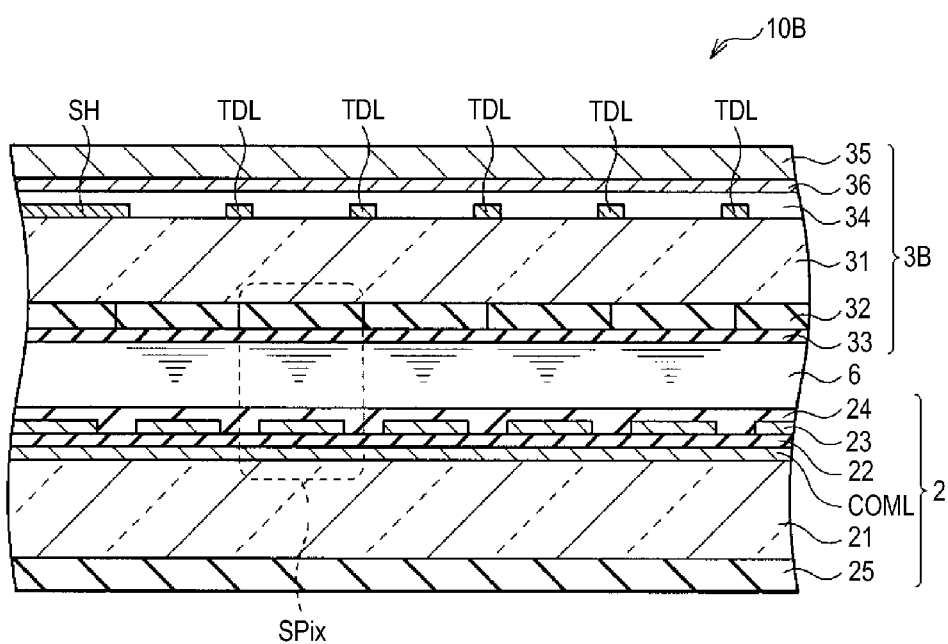
FIG. 14 is a cross-sectional view showing a schematic cross-sectional structure of a display device with a touch detection function according to a modification example of the first embodiment.

Though the electric field is formed between the polarizing plate 35 and the touch detection electrodes TDL in the above embodiment, the present disclosure is not limited to the above. For example, when a semiconductive layer 36 is provided between the adhesive layer 34 and the polarizing plate 35 as a measure against ESD as shown in FIG. 14, the electric field is formed between the semiconductive layer 36 and the touch detection electrodes TDL. The resistivity of the semiconductive layer 36 is, for example, approximately $10^8$ [$\Omega \cdot m$]. Even in this case, movement of ions due to the electric field can be suppressed and the touch detection electrodes TDL can be made inconspicuous by setting the potential difference between the voltage Vsh of the shield electrode SH and the average voltage Vave of the touch detection signal Vdet to be equal to or less than 0.5V.

[Modification Example 1-2]

Though the DC current Vsens is applied to the touch detection electrodes TDL through high resistance in the above embodiment, the present disclosure is not limited to the above. For example, a rectangular waveform which makes transition between the voltages VH and VL may be applied by a given number of display frame periods instead of the above. In this case, the average voltage Vave of the touch detection electrodes TDL will be approximately an intermediate voltage between the voltage VH and the voltage VL. Also in this case, movement of ions due to the electric field can be suppressed and the touch detection electrodes TDL can be made inconspicuous by setting the potential difference between the voltage Vsh of the shield electrode SH and the average voltage Vave to be equal to or less than 0.5V.

<3. Second Embodiment>

Next, a display panel 5 according to a second embodiment will be explained. The display panel 5 is a so-called on-cell type display panel in which the capacitance-type touch panel is formed on a display surface of the liquid crystal display panel. The same numerals and characters are given to components which are substantially the same as the display panel 1 according to the first embodiment and the explanation is appropriately omitted.

The display panel 5 includes a display device with a touch detection function 50 as shown in FIG. 4.

Figure 15:
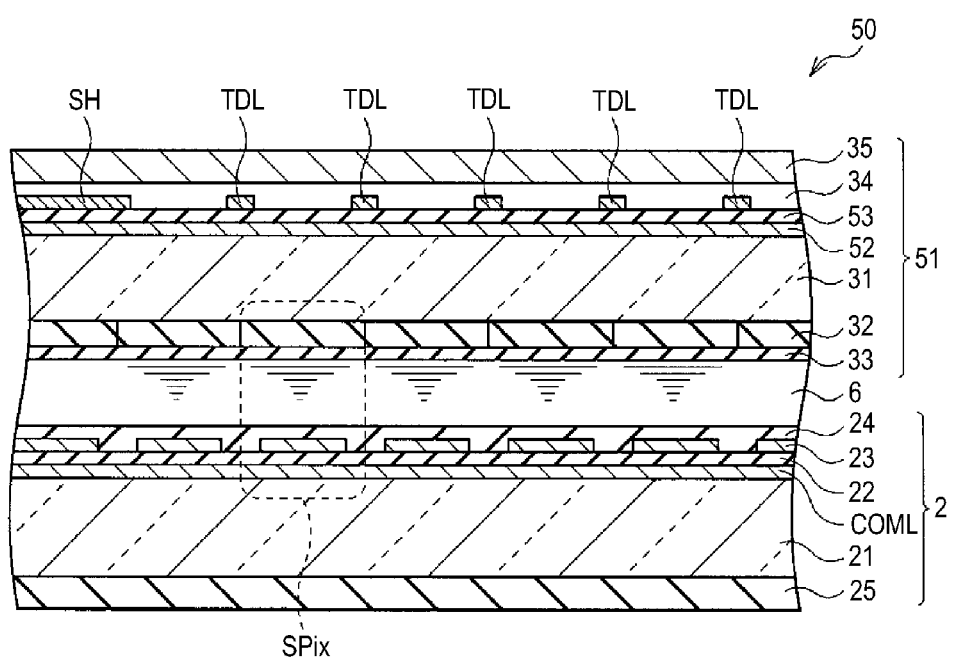
FIG. 15 is a cross-sectional view showing a schematic cross-sectional structure of a display device with a touch detection function according to a second embodiment.

FIG. 15 shows an example of a cross-sectional structure of a relevant part of the display device with the touch detection function 50. The display device with the touch detection function 50 includes a counter substrate 51. The counter substrate 51 includes a drive electrode 52 and an insulating layer 53. The drive electrode 52 and the insulating layer 53 are formed between the transparent substrate 31 and the touch detection electrodes TDL as well as the adhesive layer 34. The drive electrode 52 is made of, for example, ITO, having a strip-shaped electrode pattern extending in a direction (the right and left direction of FIG. 8) orthogonal to the extending direction of the electrode pattern of the touch detection electrodes TDL (the up and down direction of FIG. 8) in the same manner as the drive electrodes COML shown in FIG. 8. A touch detection drive signal Vcomt having the waveform shown in FIG. 9A is applied to the drive electrodes 52. The touch detection drive signal Vcomt is transmitted to the touch detection electrodes TDL through the insulating layer 53 and the touch detection signal Vdet is outputted from the touch detection electrodes TDL.

Also in this case, movement of ions due to the electric field between the polarizing plate 35 and the touch detection electrodes TDL can be suppressed and the touch detection electrodes TDL are can be made inconspicuous by setting the potential difference between the voltage Vsh of the shield electrode SH and the average voltage Vave of the touch detection signal Vdet to be equal to or less than 0.5V.

As the drive electrodes 52 are arranged at a position farther from the polarizing plate 35 than a position of the touch detection electrodes TDL, the movement of ions due to the electric field between the polarizing plate 35 and the drive electrodes 52 can be suppressed and the drive electrodes 52 can be made inconspicuous also in this case by setting the potential difference between the voltage Vsh of the shield electrode SH and the average voltage Vave of the touch detection drive signal Vcomt to be equal to or less than 0.5V.

As described above, as the potential difference between the voltage of the shield electrode and the average voltage of the touch detection drive signal is set to be equal to or less than 0.5V in the present embodiment, the discoloration of the drive electrodes 52 can be made inconspicuous. Other effects are the same as the case of the first embodiment.

[Modification Example 2-1]

Though the drive electrodes 52 and the touch detection electrodes TDL have the strip-shaped electrode pattern in the above embodiments, the present disclosure is not limited to the above. An example will be explained in detail below.

Figure 16:
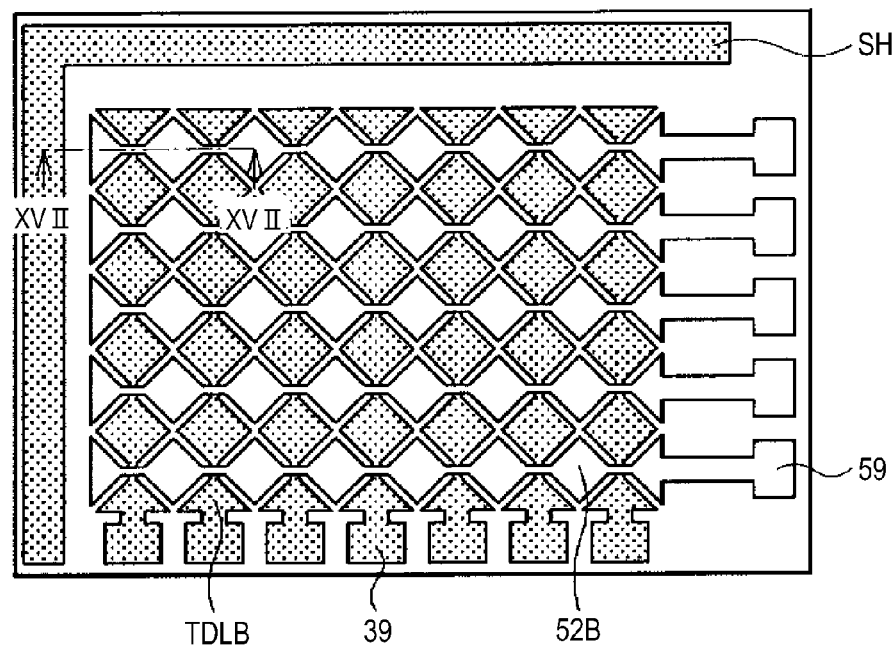
FIG. 16 is an upper surface view showing a structure example of drive electrodes and touch detection electrodes according to a modification example of the second embodiment.
Figure 17:
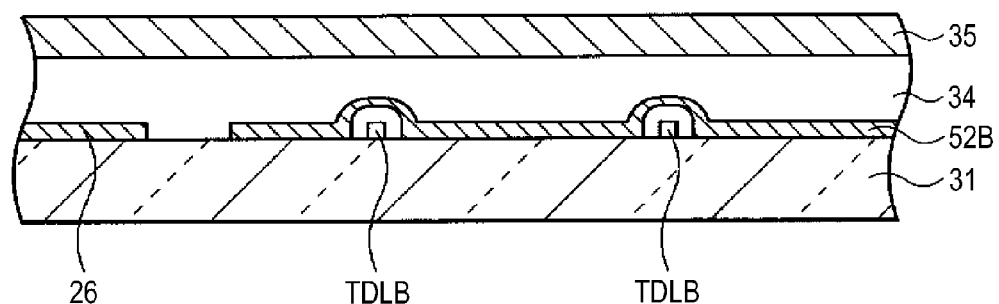
FIG. 17 is a cross-sectional view showing a structure example of the drive electrodes and touch detection electrodes according to the modification example of the second embodiment.

FIG. 16 shows an example of a structure of an upper surface of a touch detection device in a display device with a touch detection function 50B according to the present modification example. FIG. 17 shows a cross-sectional structure of a relevant part of the touch detection device shown in FIG. 16 seen from a direction of arrows XVII-XVII. The touch detection device includes drive electrodes 52B and touch detection electrodes TDLB.

The touch detection electrodes TDLB are provided in a manner where plural partial electrodes having a square shape in this example are arranged on straight lines so that one of diagonal lines is laid out in the up and down direction in FIG. 16 as well as corners of adjacent partial electrodes are connected to one another. The drive electrodes 52B are formed in the same layer as the touch detection electrodes TDLB, in which plural partial electrodes having a square shape in this example are arranged on straight lined so that one of diagonal lines is laid out in the right and left direction in FIG. 16 as well as corners of adjacent partial electrodes are connected to one another. In this case, connection portions between partial electrodes relating to the drive electrodes 52B bridge connection portions between partial electrodes relating to the touch detection electrodes TDLB as shown in FIG. 17.

The shield electrode SH is formed around the touch detection electrodes TDLB and the drive electrode 52B so as to surround these electrodes as shown in FIG. 16. In the example, the shield electrode SH is formed so as to surround these electrodes from two directions other than directions of an edge where the connection pads 39 of the touch detection electrodes TDLB are formed and an edge where connection pads 59 of the drive electrodes 52B are formed.

In the present modification example, the drive electrode 52B and the touch detection electrodes TDLB are formed in the same layer. Therefore, the discoloration of the touch detection electrodes TDLB are suppressed and the touch detection electrodes TDLB can be made inconspicuous by setting the potential difference between the voltage Vsh of the shield electrode SH and the average voltage Vave of the touch detection signal Vdet to equal to or less than 0.5V as well as the discoloration of the drive electrodes 52B can be suppressed and the drive electrodes 52B can be inconspicuous by setting the potential difference between the voltage of the shield electrode SH and the average voltage of the touch detection drive signal Vcomt to be equal to or less than 0.5V.

[Modification Example 2-2]

Though the touch detection electrodes TDL are arranged closer to the polarizing plate 35 than the drive electrodes 52 as shown in FIG. 15 in the above embodiment, the present disclosure is not limited to the above, and for example, the drive electrodes 52 may be arranged closer to the polarizing plate 35 instead of the above.

[Modification Example 2-3]

Though the display panel 2 is the so-called on-cell type display panel in which the touch panel is integrally formed on the surface of the liquid crystal display device 20 in the above embodiment, the present disclosure is not limited to the above, and for example, it is possible to form the touch panel separately from the liquid crystal display device 20 and externally attached to the liquid crystal display device 20 instead of the above. Also in this case, the discoloration of the touch detection electrodes TDL can be suppressed and the touch detection electrodes TDL can be made inconspicuous by, for example, setting the potential difference between the voltage Vsh of the shield electrode and the average voltage Vave of the touch detection signal Vdet to be equal to or less than 0.5V in the single touch panel.

<4. Application Examples>

Next, application examples of the display panel explained in the above embodiments and the modification examples will be explained.

Figure 18:
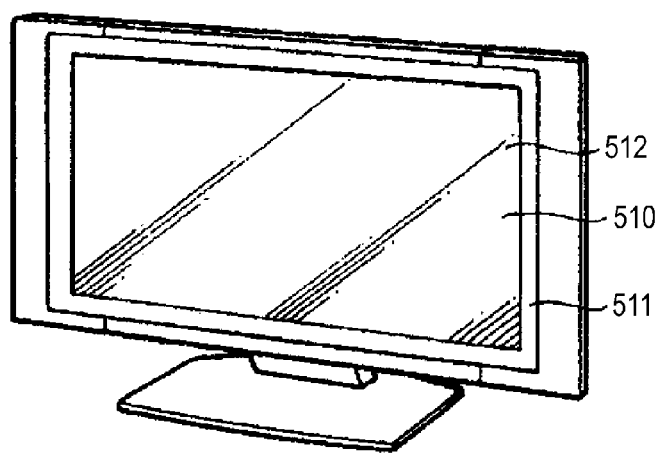
FIG. 18 is a perspective view showing an external structure of an application example of the display panel to which the embodiment is applied.

FIG. 18 shows an appearance of a television apparatus to which the display panel according to the above embodiments and the like is applied. The television apparatus has, for example, a video display screen unit 510 including a front panel 511 and a filter glass 512, in which the video display screen unit 510 is configured by using the display panel according to the above embodiments and so on.

The display panel according to the above embodiments and so on can be applied to electronic apparatuses in various fields, which are, for example, a digital camera, a notebook personal computer, portable terminal devices such as a cellular phone, portable game machines, a video camera and so on, in addition to the television apparatus. In other words, the display panel according to the above embodiments and so on can be applied to electronic apparatuses in various fields which display video.

The technology according to the present disclosure has been explained as the above by citing some embodiments, modification examples and application examples to the electronic apparatus, and the present disclosure is not limited to the above embodiments and so on and various modifications can be made.

Figure 19:
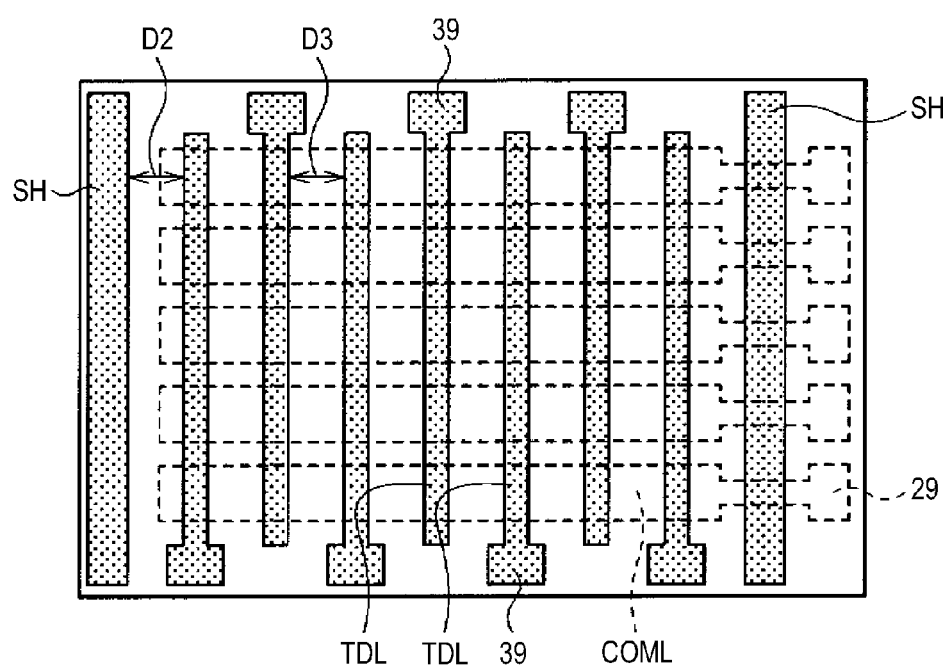
FIG. 19 is an upper surface view showing a structure example of drive electrodes and touch detection electrodes according to a modification example.

For example, the shield electrode SH is formed so as to surround the touch detection electrodes TDL from three directions in the above respective embodiments and so on as shown, for example, in FIG. 7 and FIG. 8, however, the present disclosure is not limited to the example. For example, when respective connection pads 39 are formed in two opposite edges as shown in FIG. 19, it is possible to form the shield electrode SH so as to sandwich the touch detection electrodes TDL from two directions other than the above two edges.

Additionally, for example, in the above respective embodiments and so on, the drive electrodes COML are formed on the transparent substrate 21 and the pixel electrodes 23 are formed thereon through the insulating layer 22 as shown in FIG. 5, however, the present disclosure is not limited to this and it is possible that, for example, the pixel electrodes 23 are formed on the transparent substrate 21 and the drive electrodes COML are formed thereon through the insulating film 22 instead of the above.

Figure 20:
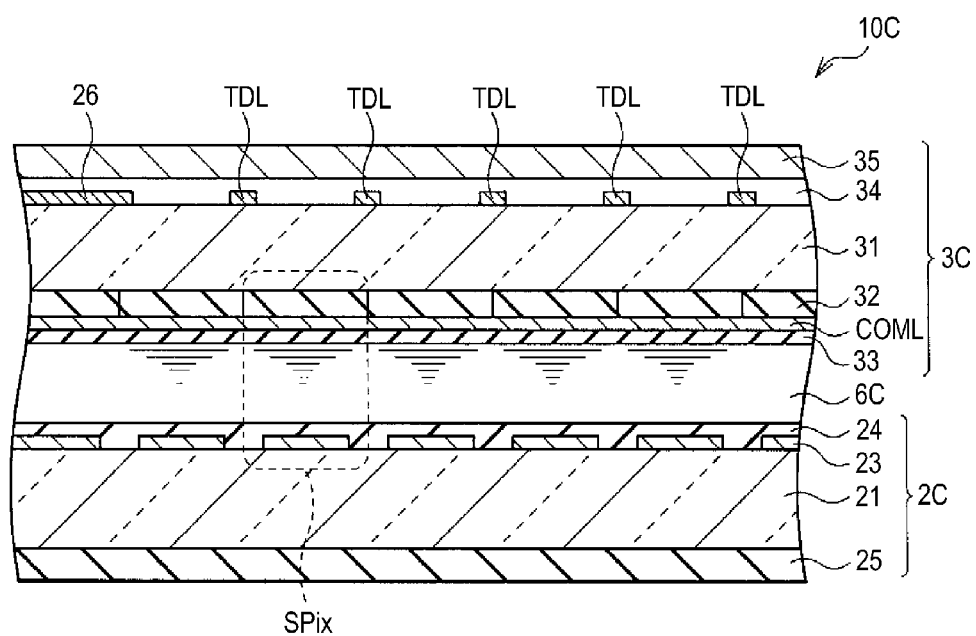
FIG. 20 is a cross-sectional view showing a schematic cross-sectional structure of a display device with a touch detection function according to another modification example.

Furthermore, for example, in the above embodiments and so on, the liquid crystal display device using lateral-electric field mode liquid crystal such as FFS or IPS is integrally formed with the touch detection device, however, liquid crystal display devices using various modes of liquid crystal such as TN (Twisted Nematic), VA (Vertical Alignment) and ECB (Electrically Controlled Birefringence) modes can be integrally formed with the touch detection device. When such liquid crystal is used, the display device with the touch detection function can be configured as shown in FIG. 20. FIG. 20 shows an example of a cross-sectional structure of a relevant part of a display device with a touch detection function 10C according to the present modification example, showing a state in which a liquid crystal layer 6C is sandwiched between a pixel substrate 2C and a counter substrate 3C. As names and functions of other portions are the same as the case of FIG. 5, the explanation thereof is omitted. The example differs from the case of FIG. 5 in a point that the drive electrodes COML used both for the display and the touch detection are formed in the counter substrate 3C.

Additionally, for example, the display panel 1 and the like are configured by using the liquid crystal display device 20 in the above respective embodiments and so on, however, the present disclosure is not limited to the above, and display devices such as an EL (Electro Luminescence) display device can be used instead of the above. Though the polarizing plate is not necessary in this case, the present disclosure can be applied when the semiconductive layer is provided on the display surface of the display panel as a measure against ESD in the same manner as the modification example 1-1, as the electric field is generated between the semiconductive layer and the touch detection electrodes TDL.

The technology according to the present disclosure may be implemented as the following configurations.

(1) A display device including
a display layer,
plural first electrodes formed to be arranged above the display layer,
a shield electrode formed apart from the plural first electrodes so as to surround the whole plural first electrodes along an arrangement surface,
an insulating layer, and
a semiconductive layer formed opposite to the first electrodes and the shield electrode so as to sandwich the insulating layer,
in which the difference between an average potential of the first electrodes and an average potential of the shield electrode is equal to or less than 0.5V.

(2) The display device described in the above (1),
in which the average potential of the shield electrode is equal to or higher than the average potential of the first electrodes.

(3) The display device described in the above (2),
in which the average potential of the shield electrode is approximately the same as the average potential of the first electrodes.

(4) The display device described in the above (2) or (3),
in which an arrangement area of the shield electrode is smaller than an arrangement area of the first electrodes.

(5) The display device described in any one of the above (1) to (4),
in which the semiconductive layer is an electrostatic prevention layer.

(6) The display device described in any one of the above (1) to (4),
in which the semiconductive layer is a polarizing plate.

(7) The display device described in any one of the above (1) to (6), further including
second electrodes formed at the same position as the first electrode or a position farther from the semiconductive layer so as to sandwich the insulating layer.

(8) The display device described in any one of the above (7),
in which the first electrodes are touch detection electrodes transmitting signals corresponding to contact/non-contact and the second electrodes are drive electrodes forming capacitance between the second electrodes and the touch detection electrodes.

(9) The display device described in the above (7),
in which the second electrodes are touch detection electrodes transmitting signals corresponding to contact/non-contact and the first electrodes are drive electrodes forming capacitance between the first electrodes and the touch detection electrodes.

(10) The display device described in any one of the above (7) to (9),
in which the difference between an average potential of the second electrodes and an average potential of the shield electrode is equal to or less than 0.5V.

(11) The display device described in any one of the above (8) to (10),
in which the display section has
a liquid crystal layer,
pixel electrodes formed between the liquid crystal layer and the drive electrodes, or arranged opposite to the liquid crystal layer so as to sandwich the drive electrodes.

(12) The display device described in any one of the above (8) to (10),
in which the display section has
a liquid crystal layer and
pixel electrodes arranged opposite to the drive electrode so as to sandwich the liquid crystal layer.

(13) The display device described in any one of the above (1) to (6),
in which the first electrodes are touch detection electrodes transmitting signals corresponding to contact/non-contact.

(14) A display device including
a display layer,
plural first electrodes formed to be arranged above the display layer,
a shield electrode formed apart from the plural first electrodes so as to surround the whole plural first electrodes along an arrangement surface,
an insulating layer, and
a semiconductive layer formed opposite to the first electrodes and the shield electrode so as to sandwich the insulating layer,
in which an average potential of the shield electrode is equal to or higher than an average potential of the first electrodes.

(15) A touch detection device including
plural first electrodes,
a shield electrode formed apart from the plural first electrodes so as to surround the whole plural first electrodes along an arrangement surface,
an insulating layer, and
a semiconductive layer formed opposite to the first electrodes and the shield electrode so as to sandwich the insulating layer,
in which the difference between an average potential of the first electrodes and an average potential of the shield electrode is equal to or lower than 0.5V.

(16) An electronic apparatus including
a display device, and
a control unit performing operation control using the display device,
in which the display device includes
a display layer,
plural first electrodes formed to be arranged above the display layer,
a shield electrode formed apart from the plural first electrodes so as to surround the whole plural first electrodes along an arrangement surface, an insulating layer, and a semiconductive layer formed opposite to the first electrodes and the shield electrode so as to sandwich the insulating layer, and the difference between an average potential of the first electrodes and an average potential of the shield electrode is equal to or less than 0.5V.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a display layer;
   a transparent substrate arranged above the display layer;
   plural first electrodes arranged on the transparent substrate;
   a shield electrode arranged on the transparent substrate, the shield electrode being apart from the plural first electrodes so as to surround the whole plural first electrodes along an arrangement surface,
   an insulating layer arranged on the plural first electrodes and the shield electrode; and
   a semiconductive layer arranged on the insulating layer,
   wherein the insulating layer is arranged between the semiconductive layer and a layer including the plural first electrodes and the shield electrode, and
   the difference between an average potential of the first electrodes and an average potential of the shield electrode is equal to or less than 0.5V.

2. The display device according to claim 1,
   wherein the average potential of the shield electrode is equal to or higher than the average potential of the first electrodes.

3. The display device according to claim 2,
   wherein the average potential of the shield electrode is approximately the same as the average potential of the first electrodes.

4. The display device according to claim 2,
   wherein an arrangement area of the shield electrode is smaller than an arrangement area of the first electrodes.

5. The display device according to claim 1,
   wherein the semiconductive layer is an electrostatic prevention layer.

6. The display device according to claim 1,
   wherein the semiconductive layer is a polarizing plate.

7. The display device according to claim 1, further comprising:
   second electrodes formed at the same position as the first electrode or a position farther from the semiconductive layer so as to sandwich the insulating layer.

8. The display device according to claim 7,
   wherein the first electrodes are touch detection electrodes transmitting signals corresponding to contact/non-contact and the second electrodes are drive electrodes forming capacitance between the second electrodes and the touch detection electrodes.

9. The display device described according to claim 7,
   wherein the second electrodes are touch detection electrodes transmitting signals corresponding to contact/non-contact and the first electrodes are drive electrodes forming capacitance between the first electrodes and the touch detection electrodes.

10. The display device according to claim 7,
    wherein the difference between an average potential of the second electrodes and an average potential of the shield electrode is equal to or less than 0.5V.

11. The display device according to claim 8,
    wherein the display section has
    a liquid crystal layer,
    pixel electrodes formed between the liquid crystal layer and the drive electrodes, or arranged opposite to the liquid crystal layer so as to sandwich the drive electrodes.

12. The display device according to claim 8,
    wherein the display section has
    a liquid crystal layer and
    pixel electrodes arranged opposite to the drive electrode so as to sandwich the liquid crystal layer.

13. The display device according to claim 1,
    wherein the first electrodes are touch detection electrodes transmitting signals corresponding to contact/non-contact.

14. A display device comprising:
    a display layer;
    a transparent substrate arranged above the display layer;
    plural first electrodes arranged on the transparent substrate;
    a shield electrode arranged on the transparent substrate, the shield electrode being apart from the plural first electrodes so as to surround the whole plural first electrodes along an arrangement surface;
    an insulating layer arranged on the plural first electrode and the shield electrode; and
    a semiconductive layer arranged on the insulating layer,
    wherein the insulating layer is arranged between the semiconductive layer and a layer including the plural first electrode and the shield electrode, and
    an average potential of the shield electrode is equal to or higher than an average potential the first electrodes.

15. A touch detection device comprising:
    a transparent substrate arranged above the display layer;
    plural first electrodes arranged on the transparent substrate;
    a shield electrode arranged on the transparent substrate, the shield electrode being apart from the plural first electrodes so as to surround the whole plural first electrodes along an arrangement surface;
    an insulating layer arranged on the plural first electrode and the shield electrode; and
    a semiconductive layer arranged on the insulating layer,
    wherein the insulating layer is arranged between the semiconductive layer and a layer including the plural first electrodes and the shield electrode, and
    the difference between an average potential of the first electrodes and an average potential of the shield electrode is equal to or less than 0.5V.

16. An electronic apparatus comprising:
    a display device; and
    a control unit performing operation control using the display device,
    wherein the display device includes
    a display layer,
    a transparent substrate arranged above the display layer;
    plural first electrodes arranged on the transparent substrate,
    a shield electrode arranged on the transparent substrate, the shield electrode being apart from the plural first electrodes so as to surround the whole plural first electrodes along an arrangement surface, an insulating layer arranged on the plural first electrodes and the shield electrode, and
a semiconductive layer arranged on the insulating layer,
the insulating layer is arranged between the semiconductive layer and a layer including the plural first electrodes and the shield electrode, and
the difference between an average potential of the first electrodes and an average potential of the shield electrode is equal to or less than 0.5V.

* * * * *